United States Patent
Cooper et al.

(10) Patent No.: US 8,085,688 B2
(45) Date of Patent: Dec. 27, 2011

(54) METHODS AND SYSTEMS FOR DETERMINING A NETWORK DATA PATH

(75) Inventors: Carl Anthony Cooper, Holmdel, NJ (US); Shiow-Ching Ho, Holmdel, NJ (US); Douglas A. Jones, Evergreen, CO (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 345 days.

(21) Appl. No.: 12/342,659

(22) Filed: Dec. 23, 2008

(65) Prior Publication Data

US 2010/0157846 A1    Jun. 24, 2010

(51) Int. Cl.
*H04L 12/28* (2006.01)
(52) U.S. Cl. ........................................ 370/254
(58) Field of Classification Search .............. 370/236, 370/254
See application file for complete search history.

(56) References Cited

U.S. PATENT DOCUMENTS

| | | | |
|---|---|---|---|
| 6,584,071 B1 | 6/2003 | Kodialam et al. | |
| 6,665,273 B1 | 12/2003 | Goguen et al. | |
| 7,406,032 B2 | 7/2008 | Li et al. | |
| 7,417,950 B2 | 8/2008 | Hofmeister et al. | |
| 2007/0253334 A1* | 11/2007 | Mehta et al. | 370/237 |
| 2008/0253281 A1 | 10/2008 | Li et al. | |
| 2009/0003337 A1* | 1/2009 | Daines et al. | 370/389 |
| 2009/0135815 A1* | 5/2009 | Pacella | 370/389 |
| 2010/0027427 A1* | 2/2010 | Kokje et al. | 370/238 |
| 2011/0026523 A1* | 2/2011 | Charzinksi et al. | 370/392 |

FOREIGN PATENT DOCUMENTS

| | | | | |
|---|---|---|---|---|
| EP | PCT/EP2004/050953 | * | 5/2004 | 370/392 |
| EP | 1898572 A1 | | 3/2008 | |
| EP | 1221788 B1 | | 6/2008 | |
| EP | 1395003 B1 | | 10/2008 | |

OTHER PUBLICATIONS

Shen et al., Calculating Interior Gateway Protocol (IGP) Routes Over Traffic Engineering Tunnels, Oct. 2004 (5 pages).
"Equal-Cost Multi-Path Routing", [Online]. Retrieved from the Internet: <URL: http://en.wikipedia.org/wiki/ECMP>, (Dec. 2, 2008), 1 pg.

(Continued)

*Primary Examiner* — Derrick Ferris
*Assistant Examiner* — Christopher R Crompton
(74) *Attorney, Agent, or Firm* — Hanley, Flight & Zimmerman, LLC.

(57) ABSTRACT

Methods and systems for path determining a network data path are described. In one embodiment, equal cost multiple paths (ECMPs) for a proposed TE tunnel on a network may be determined. The proposed TE tunnel may extend between a head-end tunneling capable router and a tail-end tunneling capable router. The network may further comprise inter router links extending between tunneling capable routers. For each inter router link of at least a portion of the inter router links, a usage count may be established for that inter router link. The usage count may be the number of ECMPs for the proposed TE tunnel that use that inter router link. A tunnel path may be selected from the ECMPs for the proposed TE tunnel that has the lowest usage count of the inter router links. The selected tunnel path may be added to a model of the network. Additional methods and systems are disclosed.

15 Claims, 8 Drawing Sheets

OTHER PUBLICATIONS

"MPLS", [Online]. Retrieved from the Internet: <URL: http://www.protocols.com/pbook/mpls.htm>, (Oct. 31, 2008), 6 pgs.

"Open Shortest Path First", [Online]. Retrieved from the Internet: >URL: http://en.wikipedia.org/wiki/Open_Shortest_Path_First>, (Dec. 2, 2008), 11 pgs.

Awduche, D., et al., "Overview and Principles of Internet Traffic Engineering", *The Internet Society*, [Online]. Retrieved from the Internet: <URL:http://www.rfc-editor.org/rfc/rfc3272.txt>, (May 2002), 67 pgs.

Fischer, Simon, et al., "REPLEX—Dynamic Traffic Engineering Based on Wardrop Routing Policies", *CoNext'06*. 2006 ACM 1-59593-456-01/06/0012, (Dec. 4, 2006), 12 pgs.

Kidston, David, et al., "Using Simulation to Evaluate Traffic Engineering Management Services in Maritime Networks" *Proceedings of the 2008 Spring Simulation Multiconference*, SpringSim 2008, (2008), 699-706.

Lakshman, Umesh, et al., "MPLS Traffic Engineering", [Online]. Retrieved from the Internet: <URL: http://www.ciscopress.com/articles/printerfriendly.asp?p=426640>, (Jan. 13, 2006), 28 pgs.

Wang, Dave, et al., "Trends in MPLS TE/FRR and QoS", *Wide Area Network Design Laboratory*, WANDL, Inc., [Online]. Retrieved from the Internet: <http://www.mpls.jp/2003/presentations/QoS_3.pdf>, (2003), 34 pgs.

* cited by examiner

METHODS AND SYSTEMS FOR DETERMINING A NETWORK DATA PATH

FIELD

This application relates to a method and system for data processing, and more specifically to methods and systems for determining a network data path.

BACKGROUND

A network provider may seek to establish traffic engineering (TE) tunnels that support unidirectional traffic flows between various routers in an Internet Protocol (IP) network. Primary and backup TE tunnels may be employed to cause routed traffic to travel through the network on a path other than the one that would have been chosen if standard routing methods had been used. Primary TE tunnels enable more efficient use of already available bandwidth in the network for particular applications and other uses.

The network provider may wish to add the TE tunnels to a model of the network prior to their actual implementation. Modifications to the model may be made to analyze the impact of the additions and identify whether further changes should be made prior to actual implementation. However, the network provider may lack some information for closely simulating changes to the model caused by the addition of the TE tunnels. This information would ordinarily become available from the routers during actual implementation of the TE tunnels in the IP network.

DETAILED DESCRIPTION

Example methods and systems for determining a network data path are described. In the following description, for purposes of explanation, numerous specific details are set forth in order to provide a thorough understanding of example embodiments. It will be evident, however, to one of ordinary skill in the art that embodiments of the invention may be practiced without these specific details.

A network provider may decide to create or update a model of an IP network with TE tunnels. The tunnel paths or routes of the TE tunnels are routed through a number of tunneling capable routers over the inter router links that connect those tunneling capable routers of the network. The tunnel path is a single path that carries a unidirectional traffic flow from a head-end tunneling capable router to a tail-end tunneling capable router, which may pass through one or more intermediate tunneling capable routers.

The tunnel paths are determined without access to all data available from the tunneling capable routers. Such information would ordinarily not be available unless the determination was made based on establishing tunnel paths for TE tunnels in an active network with real traffic.

A single shortest path or multiple equal cost multiple paths (ECMPs) are determined for each of the tunnels. The ECMPs are alternate paths for sending traffic from a given head end to a given tail end in a network that have a same transmission cost. The transmission cost is based on a sum of the costs assigned to each of the inter router links of the paths (e.g., by the network provider).

When ECMPs occur for a tunnel, a selection of one of the ECMPs as the tunnel path is made. For each of the inter router links of the model, the number of single shortest paths and ECMPs for all tunnel paths in the model that use the inter router link is counted. The tunnel path of the ECMPs that minimizes inter router link usage on the IP network 104 is identified. When multiple paths are still identified as being potential tunnel paths, a tie breaking procedure is used to select the tunnel path.

Figure 1:
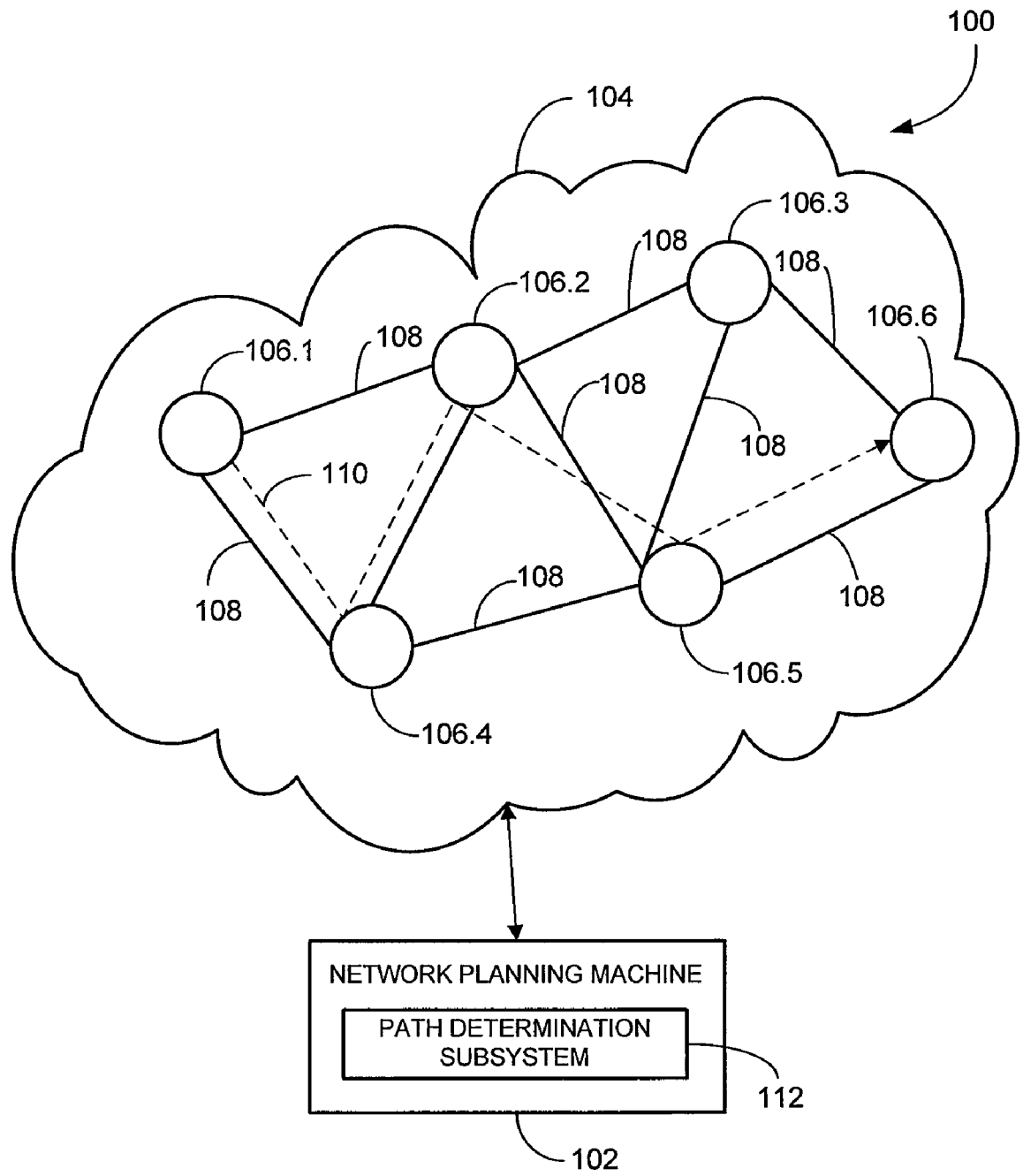
FIG. 1 is a block diagram of a system, according to an example embodiment.

FIG. 1 illustrates an example system 100 in which a network provider operates a network planning machine 102 to enable planning of an internet protocol (IP) network 104. The network planning machine 102 may be used by the network provider to plan for capacity, performance and survivability issues associated with potential modifications to the IP network 104 prior to their actual implementation. In some embodiments, the network planning machine 102 parses configuration files, polls through various network elements for loading information, simulates changes to the various network elements of the IP network 104, simulates traffic, and computes primary TE tunnel paths.

A model of the IP network 104 is created or updated by the network provider using the network planning machine 102. The model of the IP network 104 represents a proposed or actual implementation of the IP network 104. The model includes a number of tunneling capable routers that are connected with one another by inter router links. In one embodiment, the model includes other network devices (e.g., non-tunneling capable routers) and/or other types of device links.

The model of the IP network 104 as shown in FIG. 1 includes a number of tunneling capable routers 106.1-106.6 connected by inter router links 108. The tunneling capable routers 106.1-106.6 are routers that are capable of supporting TE tunnels among some of the tunneling capable routers 106.1-106.6 of the IP network 104. The TE tunnels are data tunnels used to direct the flow of IP packets from a specific head-end router over a pre-determined path to a specific tail-end router.

The model of the IP network 104 may include primary TE tunnels and backup TE tunnels. The primary TE tunnels are used to establish the normal flow of IP packers over pre-determined paths. The backup TE tunnels are used to quickly redirect the normal flow of IP packets around a failed inter router link. For example, the backup TE tunnels may be used to prevent momentary service disruptions during a brief interval when the interior gateway protocol of the IP network 104 is re-converging. After an alternate path around the failed link has been established through re-convergence of the interior gateway protocol, the flow of IP packets follows the alternate path rather than the backup TE tunnel.

In one particular embodiment, the tunneling capable routers 106.1-106.6 include CISCO CRS-1 routers and the interior gateway protocol used by the tunneling capable routers 106.1-106.6 is Open Shortest Path First (OSPF). However, other types and brands of tunneling capable network devices and different protocols may also be used. For example, other router types capable of supporting TE tunnels and with other interior gateway protocols may also be used.

The inter router links 108 provide a data connection between the tunneling capable routers 106.1-106.6. For example, a data packet in an IP network may flow from a tunneling capable router 106.2 to a tunneling capable router 106.3 through a particular inter router link.

A tunnel path 110 of a primary TE tunnel is shown in FIG. 1 as being routed from a head-end tunneling capable router 106.1 of the tunnel path 110 to a tail-end tunneling capable router 106.6 through some of the other tunneling capable routers illustrated in 106.2-106.5. The tunnel path 110 as shown passes successively through tunneling capable routers 106.4, 106.2, 106.5. The tunnel path 110 shown in FIG. 1 proceeds in a single direction from the tunneling capable router 106.1 to the tunneling capable router 106.6.

The IP network 104 over which the tunneling capable routers 106.1-106.6 are in communication may be a Global System for Mobile Communications (GSM) network, a Multi Protocol Label Switching (MPLS) enabled network, a Wireless Application Protocol (WAP) network, a WiFi network, or an IEEE 802.11 standards network as well as various combinations thereof. Other conventional and/or later developed wired and wireless networks may also be used.

A path determination subsystem 112 is deployed within the network planning machine 102 and is configured to add or modify tunnel paths running through the tunneling capable routers 106.1-106.6 of the network planning machine's model of the IP network 104. The path determination subsystem 112 simulates routes to be taken by one or more tunnel paths. The path determination subsystem 112 may, in an example embodiment, simulate one or more potential paths of a particular TE tunnel in the IP network 104 because all of the data used by the tunneling capable routers 106.1-106.6 in deriving the path of the TE tunnel is not generally available to the path determination subsystem 112.

In one particular embodiment, the path determination subsystem 112 may simulate a tunnel path of the TE tunnel from the head-end tunneling capable router 106.1 to the tail-end tunneling capable router 106.6 using available information from the tunneling capable routers 106.1-106.6, such as the OSPF cost and OSPF area of each of the inter router links 108 between all pairs of the tunneling capable routers 106.1-106.6 of the IP network 104.

Figure 2:
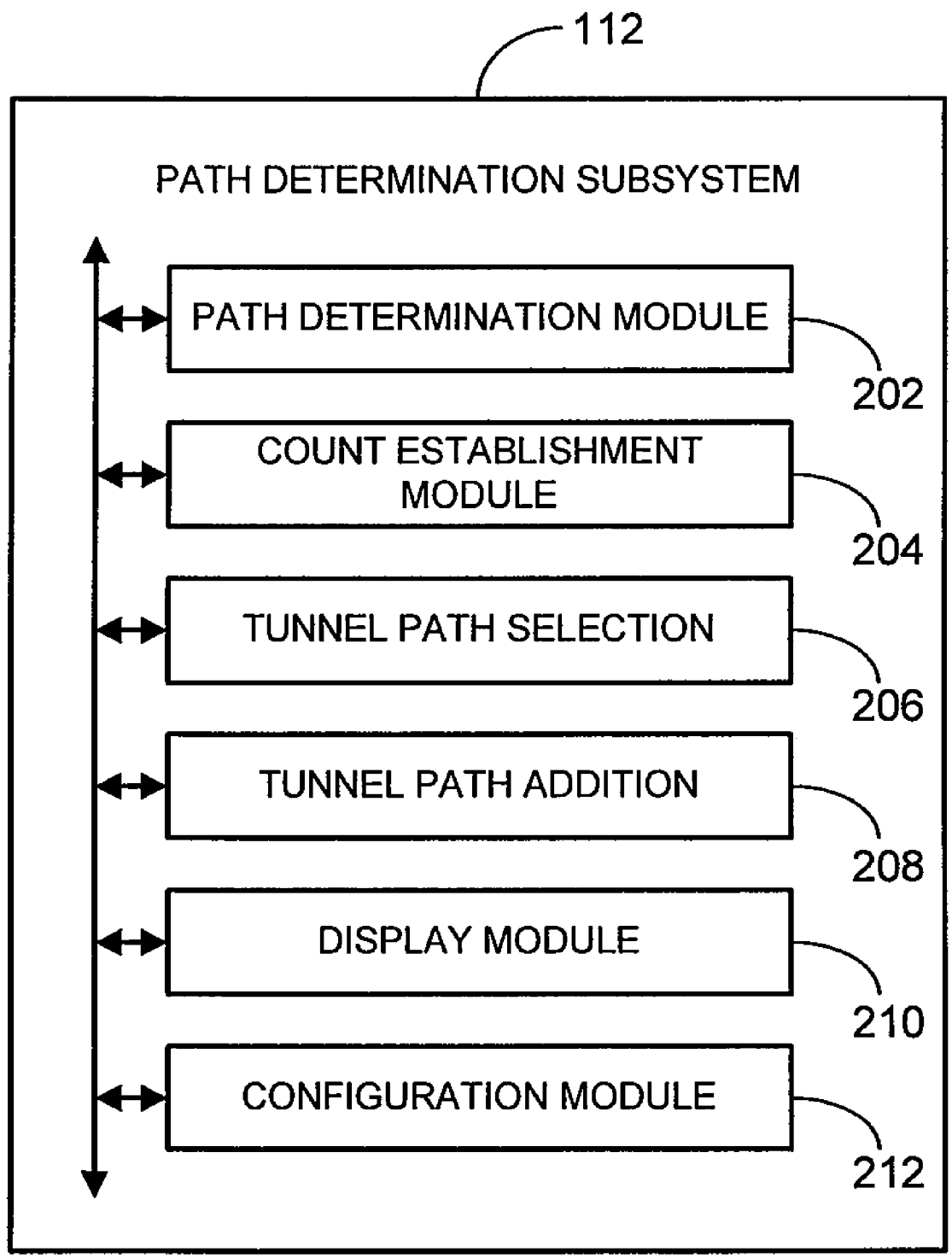
FIG. 2 is a block diagram of a path determination subsystem that may be deployed within the system of FIG. 1, according to an example embodiment.

FIG. 2 illustrates an example path determination subsystem 112 deployed in the network planning machine 102 of the system 100 (see FIG. 1). The path determination subsystem 112 includes a path determination module 202, a count establishment module 204, a path selection module 206, a tunnel path addition module 208, a display module 210, and/or a configuration module 212. Other modules may also be included.

Multiple primary TE tunnels may be determined for a model of the IP network 104 using the path determination subsystem 112. For each primary TE tunnel of a model, the path determination module 202 determines the least cost paths between the head-end tunneling capable router to and the tail-end tunneling capable router. For example, the least cost paths may be OSPFs calculated using an OSPF algorithm. An example tunnel path 110 for the IP network 104 is shown in FIG. 1.

A single least cost path is produced as a result of the path computation module 202 for some TE tunnels. The single least cost path acts a unique path from the head-end tunneling capable router to the tail-end tunneling capable router. For other TE tunnels, the result of the path computation module 202 yields ECMPs for each of these TE tunnels. In this case, a selection of a single path for a proposed TE tunnel is made among the candidate paths defined by the ECMPs. The count establishment module 204 and the path selection module 206 address the analysis of candidate paths to find a specific path for the TE tunnel.

The count establishment module 204 establishes a usage count for each of the inter router links 108 by calculating (1) the number of previously determined TE tunnels which use that inter router link, and (2) the number of ECMP candidate paths (those paths determined as candidates for each proposed TE tunnels) which use that inter router link. The usage count enables selection of a candidate path that uses certain inter router links that are not used or are used less frequently by tunnel paths of the other TE tunnels of the model that have already been determined, or will not be used or are likely to be used less frequently by other multiple candidate paths of other TE tunnels of the model whose tunnel paths have not yet been selected.

The path selection module 206 then selects, for each TE tunnel of the model with multiple candidate paths, the tunnel path with the lowest usage count of the inter router links 108. This calculation is repeated until all candidate paths have been chosen once. The count establishment module 204 and the path selection module 206 thereby seek, to the extent possible, to minimize the number of tunnel paths on the inter router links 108 of the IP network 104.

The path selection module 206 may consider all potential candidate paths of the TE tunnels simultaneously. Once all tunnels with single paths have been identified and a candidate path is selected for the first proposed TE tunnel, the path selection process may proceed iteratively for the proposed remaining TE tunnels. The iterative process may consider a selected candidate path for a proposed TE tunnel as having a unique path and perform the calculation of the count establishment module 204 again on that basis.

When multiple candidate paths of a particular TE tunnel have the same usage count of the inter router links 108, a tie breaking procedure may be used to select from the candidate paths.

The path selection module 206 first selects from among the candidate paths that have the least number of hops. The number of hops are the number of inter router links traversed between the head-end router and the tail-end router of a candidate path. When multiple candidate paths remain, the path selection module 206 may randomly select the tunnel path 110 from the multiple candidate paths.

The tunnel path addition module 208 adds the tunnel path 110 to a model of the IP network 104. The model may be created or otherwise accessed by the path determination subsystem 112.

The display module 210 displays various network elements of a model of the IP network 104. The various elements may be displayed graphically (e.g., through a user interface), or may be otherwise displayed.

The various network elements displayed in the model of the IP network 104 may include the tunneling capable routers 106.1-106.6, the inter router links 108, and/or one or more tunnel paths including the tunnel path 110.

The configuration module 212 configures one or more network elements of the IP network 104 based on the selection of the tunnel path 110 and/or the addition of the tunnel path 110 to the model. The network elements include, by way of example, one or more of the tunneling capable routers 106.1-106.6 and/or one or more of the inter router links 108. The TE tunnels may be established in the IP network 104 based on the model. For example, a program on some of the tunneling capable routers 106.1-106.6 may be configured to provide the tunnel paths of the TE tunnels. The configuration of the IP network 104 by the configuration module 212 may occur automatically or manually.

Figure 3:
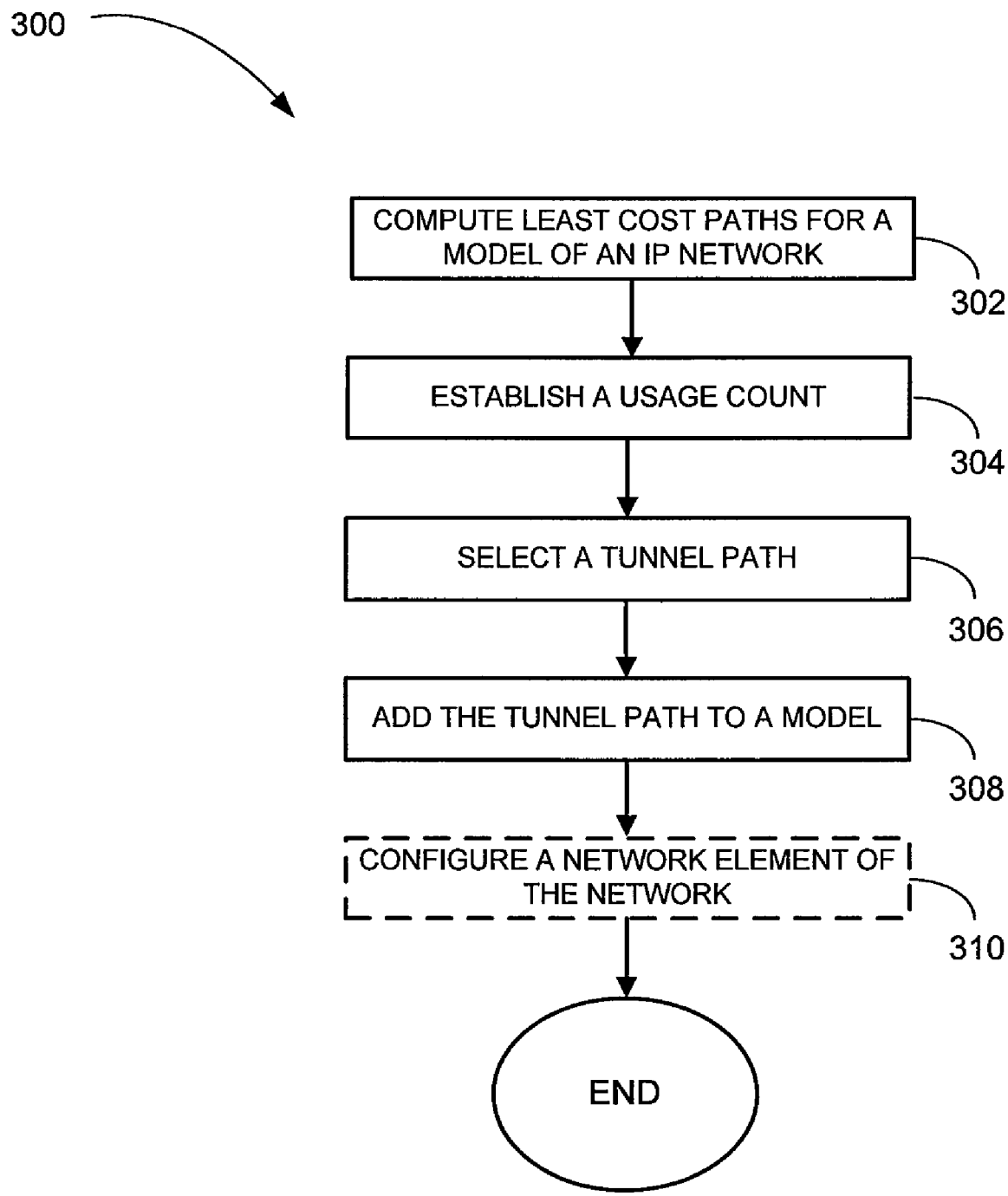
FIG. 3 is a block diagram of a flowchart illustrating a method for path determination, according to an example embodiment.

FIG. 3 illustrates a method 300 for path determination, according to an example embodiment. The method 300 may be used to determine a path of one or more primary TE tunnels in a model of an IP network that each has ECMPs. The method 300 may be performed by the network planning machine 102 of the system 100 (see FIG. 1), or may be otherwise performed.

For each primary TE tunnel of a model of an IP network, the least cost paths between the head-end tunneling capable router to and the tail-end tunneling capable router are computed at block 302. When multiple ECMPs occur, a tie breaking procedure is performed at blocks 304, 306.

A usage count is first established against at least a portion of the inter router links of the IP network at block 304. The count may be established against a particular inter router link established by calculating (1) a number of unique TE tunnels (whose determined tunnel path was a single path that did not include ECMPs) use the particular inter router link in a model of the IP network, (2) and a number of the equal cost multiple paths for the TE tunnel and any other TE tunnels of the model that use the particular inter router link. The portion may be all inter router links of the network 104, only the inter router links associated with ECMPs of the proposed tunnel path, or other portions of inter router links may be used.

A tunnel path for the TE tunnel is then selected from the equal cost multiple paths that has the lowest usage count of the inter router links of the IP network 104. In an example embodiment, the tunnel path 110 may provide an explicit, pre-defined routing based on various criteria beyond OSPF costs, which can provide improved capabilities in the IP network 104 for certain service types.

The tunnel path 110 is added to a model of the IP network 104 at block 308. The resulting model may be used by a network provider for network planning purposes. The operations performed at blocks 304-308 may be performed iteratively or otherwise until all tunnels that had ECMPs are added to the model.

One or more network elements of the IP network 104 may be configured at block 310 based on the selection of the tunnel path and/or the addition of the tunnel path to the model. For example, the network provider may decide to manually or automatically add, remove, modify, or otherwise configure network elements of the IP network 104 based on further analysis with the resulting model.

Figure 4:
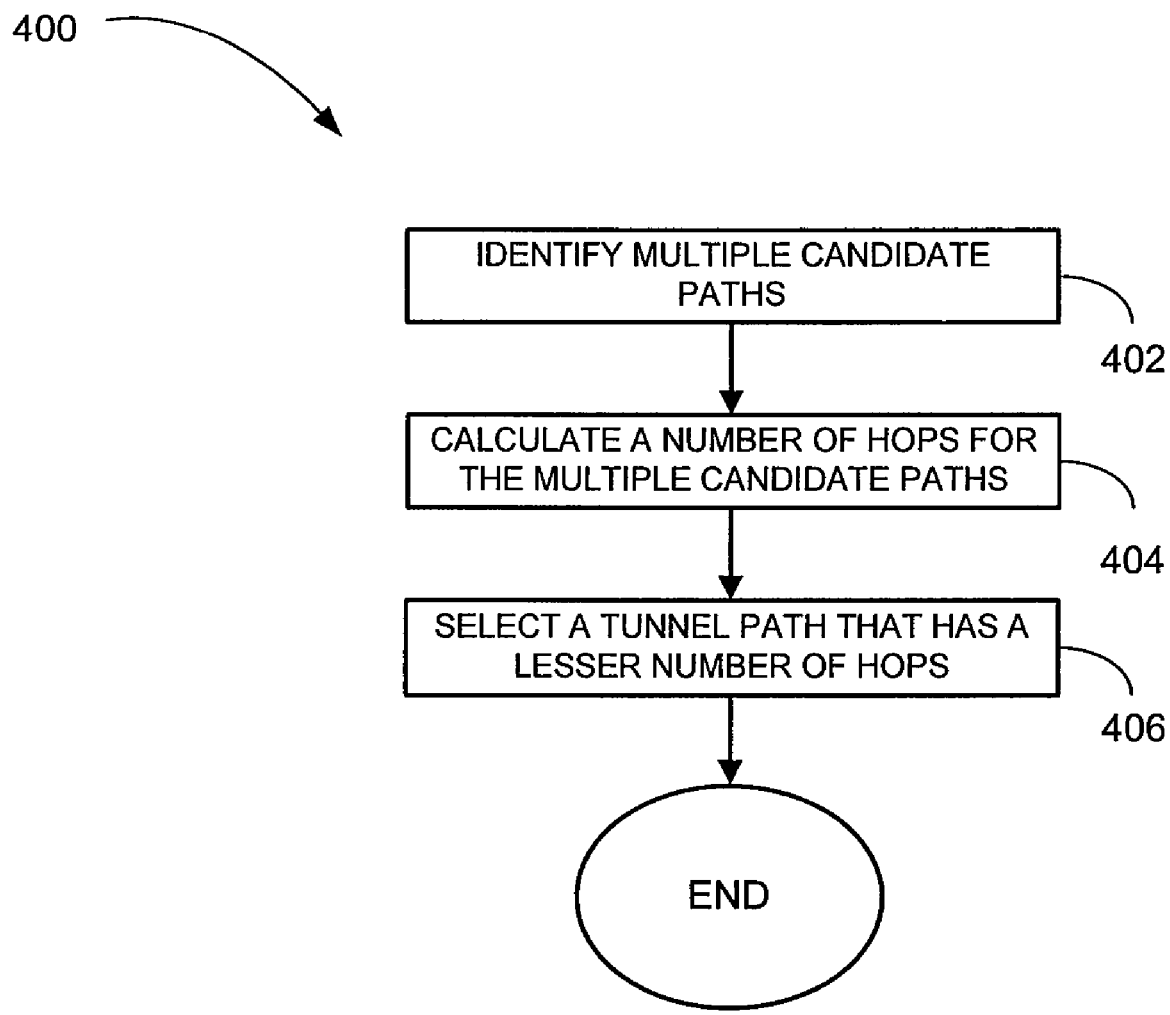
FIGS. 4 and 5 are block diagrams of flowcharts illustrating methods for tunnel path selection, according to example embodiments.

FIG. 4 illustrates a method 400 for tunnel path selection, according to an example embodiment. The method 400 may be performed as a tie breaking procedure between multiple ECMPs identified for a tunnel. The method 400 may be performed at block 308 (see FIG. 3), or may be otherwise performed.

At block 402, multiple candidate paths are identified among the ECMPs as having the same lowest usage count of the inter router links 108 of the IP network 104.

A number of hops is calculated at block 404 for the multiple candidate paths between the head-end tunneling capable router and the tail-end tunneling capable router. For example, the number of hops between the head-end tunneling capable router 106.1 and the tail-end tunneling capable router 106.6 may reflect the different number of inter router links 108 traversed through the a candidate path while passing through some of the intermediate tunneling capable routers 106.2-106.5.

The tunnel path is then selected at block 406 from the candidate paths based on which candidate path has the least number of hops.

Figure 5:
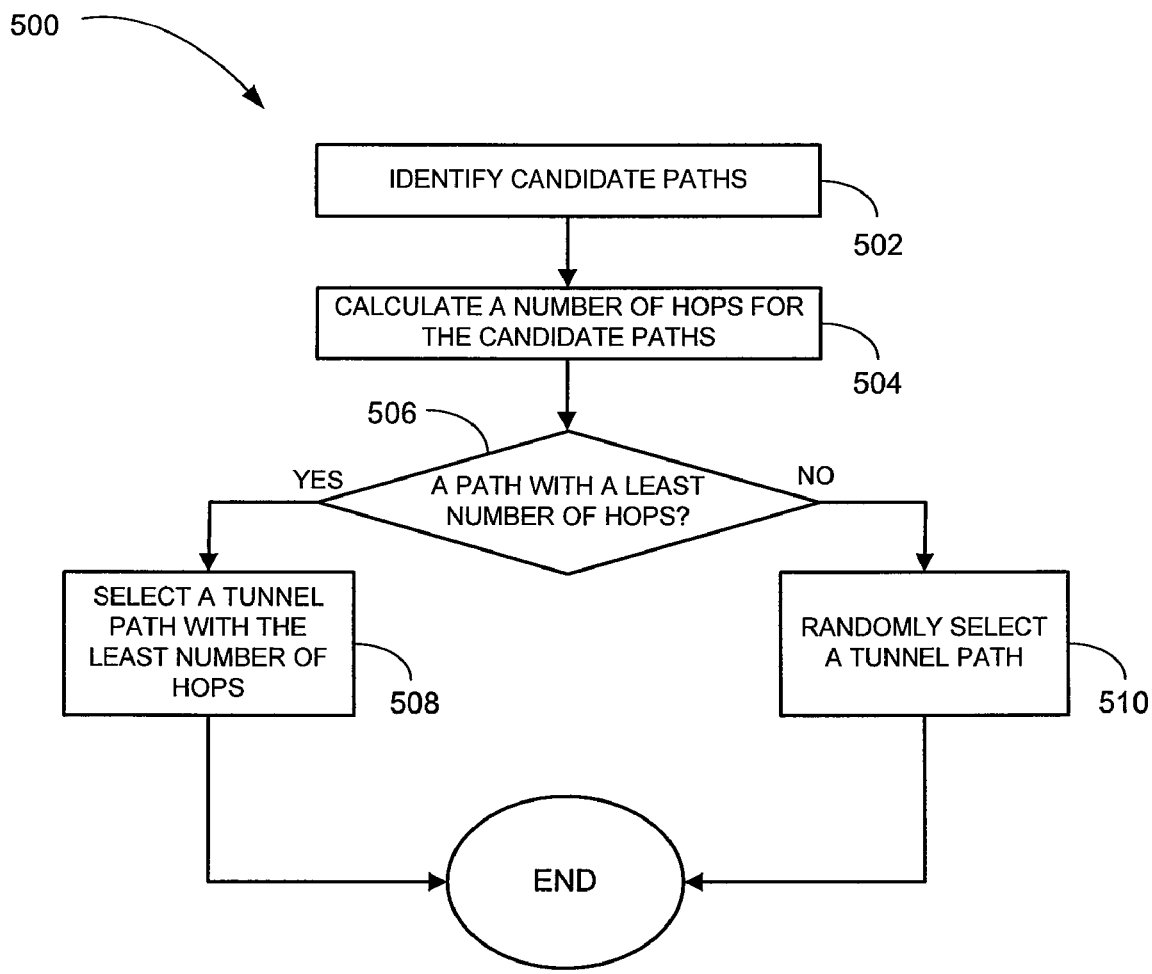

FIG. 5 illustrates a method 500 for tunnel path selection, according to an example embodiment. The method 500 may be performed as a tie breaking procedure between multiple ECMPs identified for a tunnel. The method 500 may be performed at block 308 (see FIG. 3), or may be otherwise performed.

At block 502, multiple candidate paths are identified among the ECMPs as having the same lowest usage count of the inter router links 108 of the IP network 104.

At block 504, a number of hops is calculated for the multiple candidate paths between the head-end tunneling capable router and the tail-end tunneling capable router.

At decision block 506, a determination is made as to whether only one candidate path has the least number of hops. If a determination is made that a single candidate path has the least number of hops, then that candidate path is selected as the tunnel path at block 508. If a determination is made that multiple candidate paths have the same least number of hops at decision block 506, then one of the multiple candidate paths having the least number of hops is randomly selected as the tunnel path at block 510.

Figure 6:
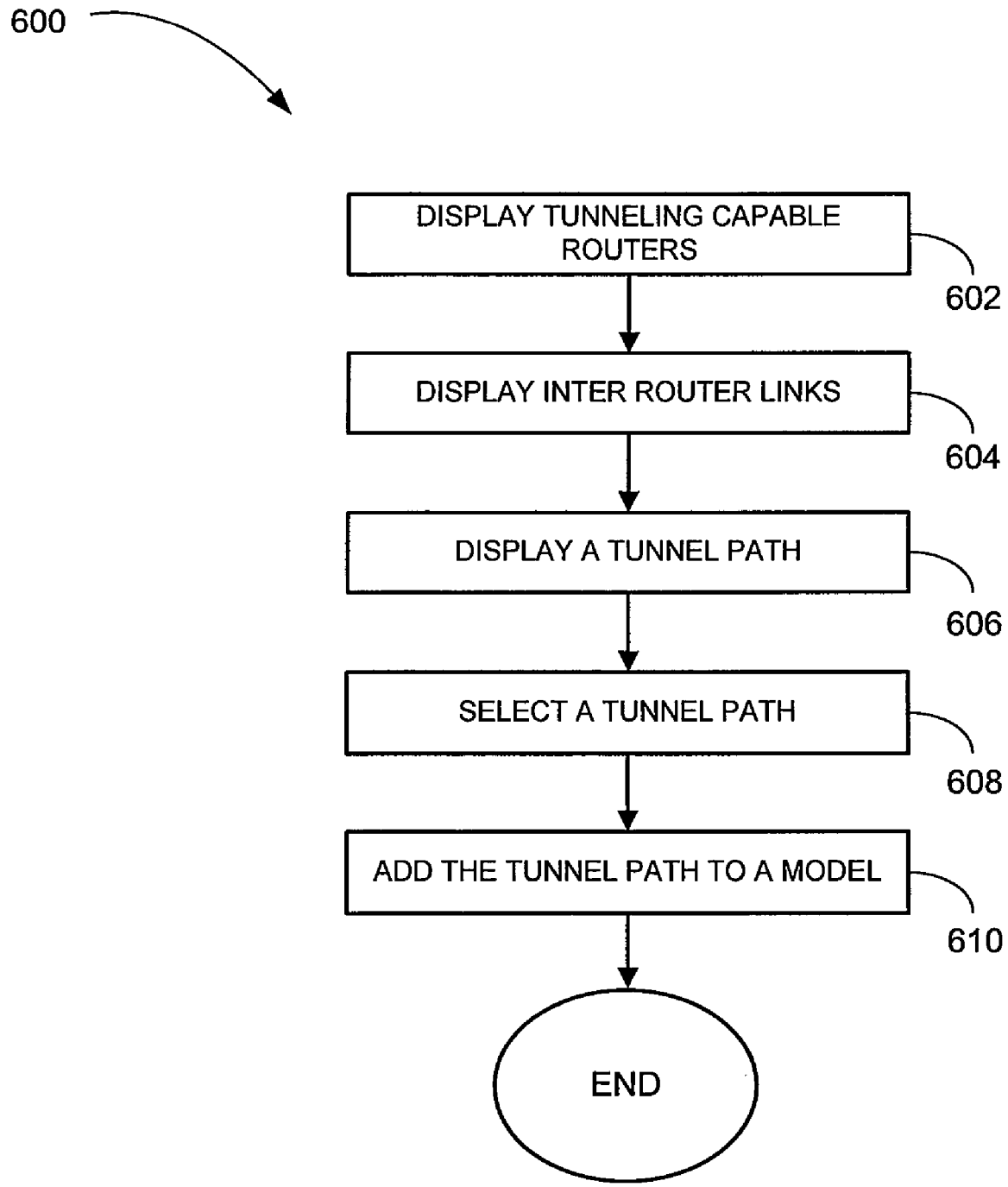
FIG. 6 is a block diagrams of a flowchart illustrating a method for model displaying, according to an example embodiment.

FIG. 6 illustrates a method 600 for model displaying, according to an example embodiment. The method 600 may be performed to display a model of the IP network 104 (see FIG. 1), or may be otherwise performed.

The tunneling capable routers 106.1-106.6 are displayed at block 602 as a portion of a model of the IP network 104. The tunnel path 110 is displayed at block 604 as an additional portion of the model of the IP network 104. The inter router links 108 may be displayed at block 606 as a further portion of the model of the IP network 104.

Figure 7:
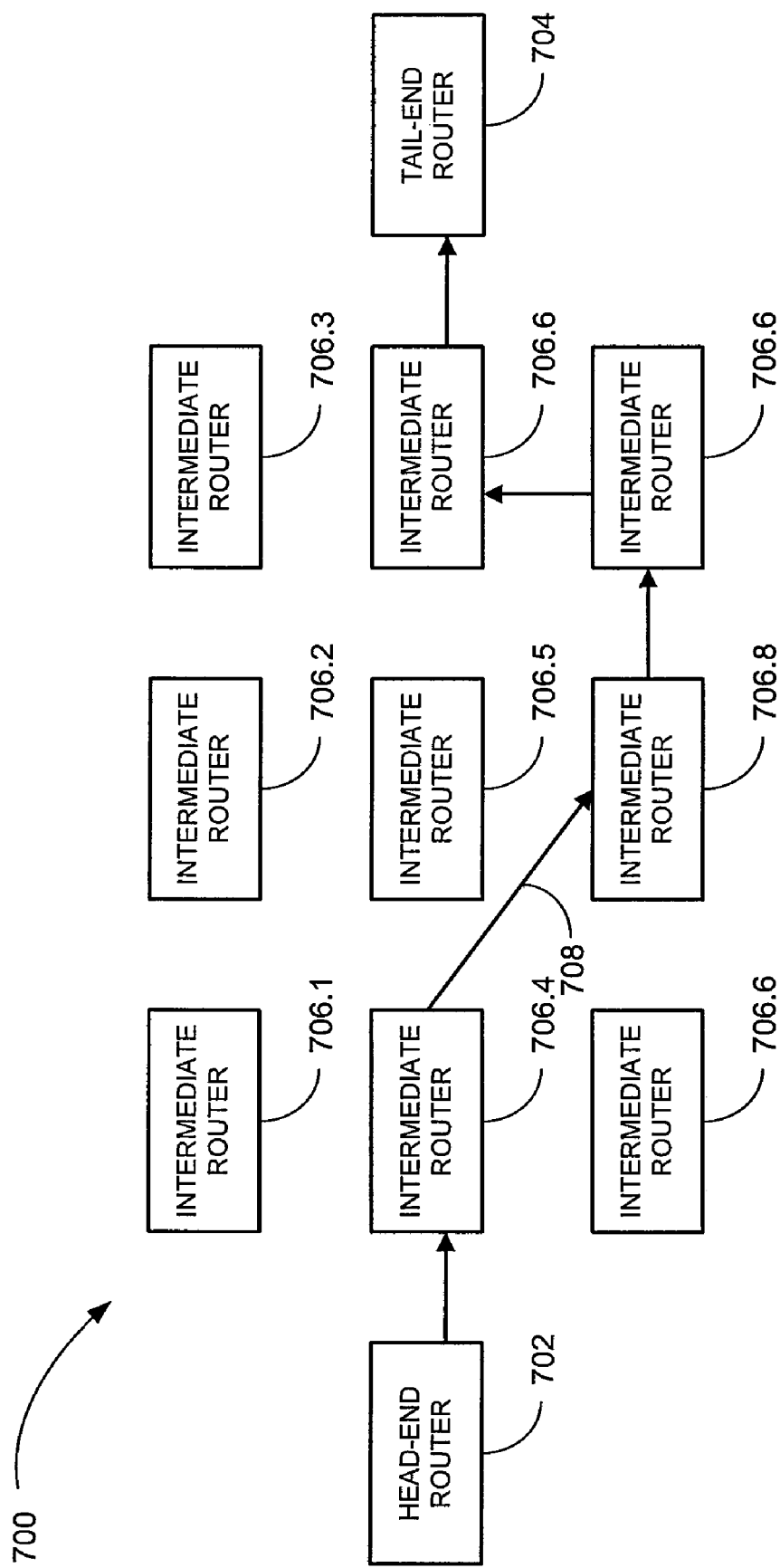
FIG. 7 is a block diagram of a model of networked routers, according to an example embodiment.

FIG. 7 is a block diagram of a model 700 of a network including multiple tunneling capable routers, according to an example embodiment. The model 700 is an example of a model of an IP network that may be produced by the method 300 and/or displayed by the method 600 (see FIGS. 3 and 6). The model 700 may be based on an enterprise network or a different type of network.

The model 700 includes a head-end tunneling capable router 702, a tail-end tunneling capable router 704, and a number of intermediate tunneling capable routers 706.1-706.6. The tunneling capable routers 702, 704, 706.1-706.6 are networked together by inter router links. The tunneling capable routers 702, 704, 706 are an example implementation of the tunneling capable routers 106.1-106.6 (see FIG, 1). The routers 702, 704, 706.1-706.6 may be CISCO CRS-1 routers or other types of tunnel capable routers. A different number of routers and additional network devices may be used in other implementations.

A tunnel path 708 of a primary TE tunnel is shown to originate at the head-end router 702 and end at the tail-end router 704. The first tunnel path 708 is routed through an intermediate tunneling capable router 706.4, an intermediate tunneling capable router, 706.8, an intermediate tunneling capable router 706.6, and an intermediate tunneling capable router 706.6. While a single tunnel path is shown in FIG. 6, multiple primary tunnel paths and backup tunnel paths may be used in the IP network. The tunnel paths may be routed in a single direction between the head-end router 702 and end at the tail-end router 704, or in both directions.

Figure 8:
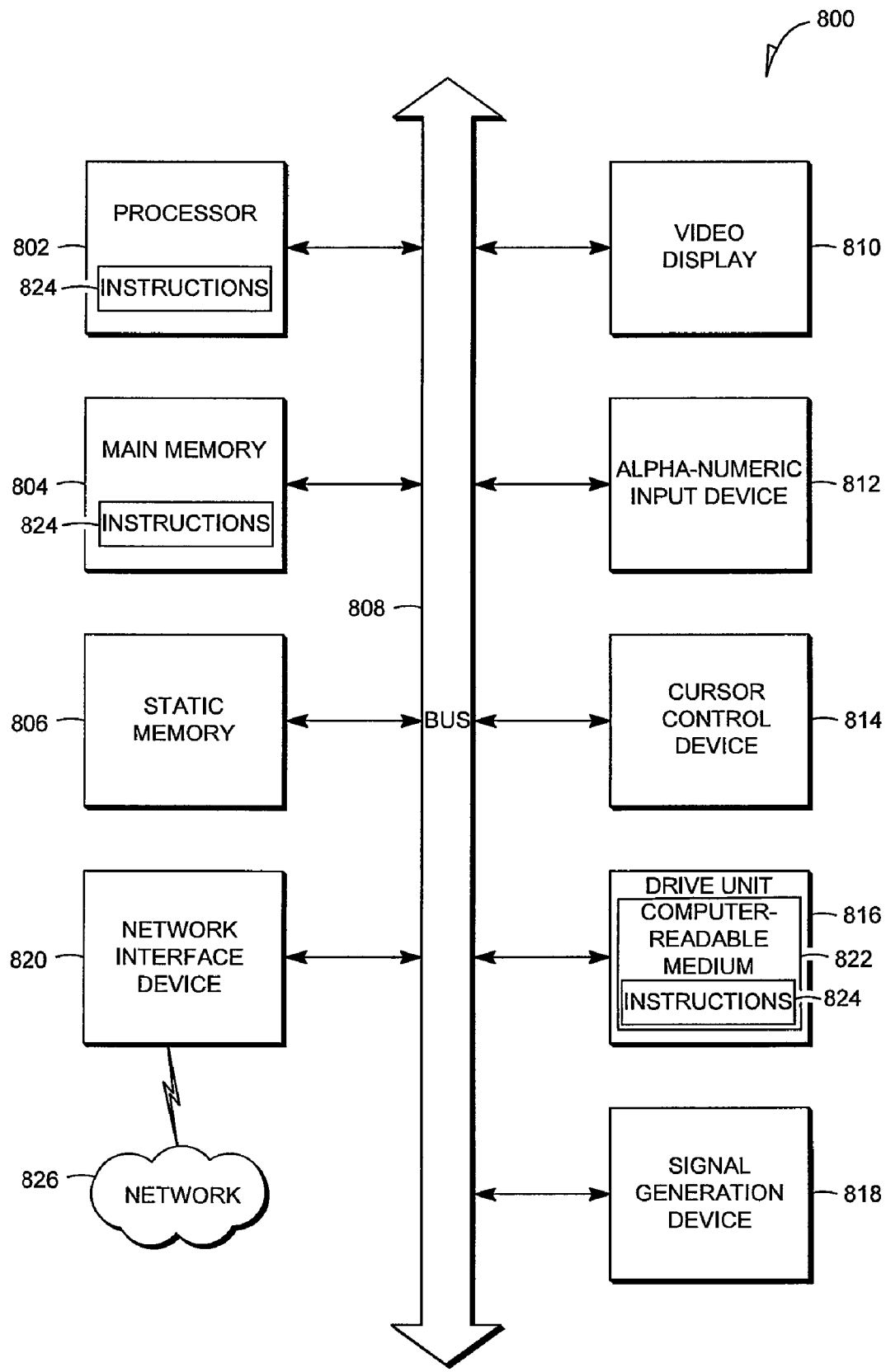
FIG. 8 is a block diagram of a machine in the example form of a computer system within which a set of instructions for causing the machine to perform any one or more of the methodologies discussed herein may be executed.

FIG. 8 shows a block diagram of a machine in the example form of a computer system 800 within which a set of instructions may be executed causing the machine to perform any one or more of the methods, processes, operations, or methodologies discussed herein. The network planning machine 82 (see FIG. 1) may include the functionality of the one or more computer systems 800.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, a kiosk, a point of sale (POS) device, a cash register, an Automated Teller Machine (ATM), or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU) a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a cursor control device 814 (e.g., a mouse), a drive unit 816, a signal generation device 818 (e.g., a speaker) and a network interface device 820.

The drive unit 816 includes a machine-readable medium 822 on which is stored one or more sets of instructions (e.g., software 824) embodying any one or more of the methodologies or functions described herein. The software 824 may also reside, completely or at least partially, within the main memory 804 and/or within the processor 802 during execution thereof by the computer system 800, the main memory 804 and the processor 802 also constituting machine-readable media.

The software 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the present invention. The term "machine-readable medium" shall accordingly be taken to include, but not be limited to, solid-state memories, and optical media, and magnetic media, but to exclude propagating signals.

Certain systems, apparatus, applications or processes are described herein as including a number of modules. A module may be a unit of distinct functionality that may be presented in software, hardware, or combinations thereof. When the functionality of a module is performed in any part through software, the module includes a machine readable medium. The modules may be regarded as being communicatively coupled.

The inventive subject matter may be represented in a variety of different embodiment of which there are many possible permutations.

In an example embodiment, a plurality of a plurality of equal cost multiple paths for a proposed traffic engineering (TE) tunnel on a network may be determined. The proposed TE tunnel may extend between a head-end tunneling capable router and a tail-end tunneling capable router. The network may further comprise a plurality of intermediate tunneling capable routers, and a plurality of inter router links extending between tunneling capable routers. The plurality of equal cost multiple paths may be determined in a model of a network. For each inter router link of at least a portion of the plurality of inter router links, a usage count may be established for that inter router link. The usage count may be the number of equal cost multiple paths for the proposed TE tunnel that use that inter router link. A tunnel path may be selected from the plurality of equal cost multiple paths for the proposed TE tunnel that has the lowest usage count of the plurality of inter router links. The selected tunnel path may be added to a model of the network.

Thus, methods and systems for determining a network data path have been described. Although embodiments of the present invention have been described with reference to specific example embodiments, it will be evident that various modifications and changes may be made to these embodiments without departing from the broader spirit and scope of the embodiments of the invention. Accordingly, the specification and drawings are to be regarded in an illustrative rather than a restrictive sense.

It should be noted that the methods described herein do not have to be executed in the order described, or in any particular order. Moreover, various activities described with respect to the methods identified herein can be executed in serial or parallel fashion.

It will be understood that although "End" blocks are shown in the flowcharts, the methods may be performed continuously.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus the following claims are hereby incorporated into the Detailed Description, with each claim standing on its own as a separate embodiment.

What is claimed is:

1. A method comprising:
   generating, with a processor, a model of an Internet Protocol network, the network to include a proposed tunnel, the proposed tunnel to extend between a head-end tunneling capable router and a tail-end tunneling capable router, the network further comprising a plurality of intermediate tunneling capable routers, and a plurality of inter router links;

determining costs for candidate paths for implementing the proposed tunnel in the network, the cost of each of the candidate paths comprising a sum of transmission costs assigned to respective ones of the inter router links implementing the respective candidate path;

comparing the costs of the candidate paths to identify a single least cost path for the proposed tunnel or a plurality of equal cost candidate paths for the proposed tunnel;

if a single least cost path is identified, selecting the single least cost path to implement the tunnel;

if the plurality of equal cost candidate paths are identified, calculating a proposed usage of each of the equal cost candidate paths, the proposed usage of each of the equal cost candidate paths being calculated by summing respective usage counts for each inter router link of the respective equal cost candidate path, the usage count of each inter router link being calculated based on (1) a number of assigned tunnels already selected to use the inter router link and (2) a number of equal cost candidate paths which would use the inter router link if selected;

selecting one of the equal cost candidate paths that has the lowest proposed usage to implement the proposed tunnel; and adding the proposed tunnel as an assigned tunnel to the model of the network, the assigned tunnel to utilize the selected one of the equal cost candidate paths.

2. The method of claim 1, further comprising:

if two or more of the equal cost candidate paths have the lowest proposed usage, calculating a number of hops for each of the two or more of the equal cost candidate paths between the head-end tunneling capable network device and the tail-end tunneling capable network device; and selecting one of the two or more of the equal cost candidate paths having a lowest number of hops to implement the proposed tunnel.

3. The method of claim 2, wherein if more than one of the equal cost candidate paths has the lowest number of hops, randomly selecting one of the equal cost candidate paths having the lowest number of hops to implement the proposed tunnel.

4. The method of claim 1, comprising:

configuring a network element of the network based on the assigned tunnel.

5. The method of claim 4, wherein the network element includes at least one of the head-end tunneling capable router, the tail-end tunneling capable router, a particular intermediate tunneling capable router of the plurality of intermediate tunneling capable routers, or an inter router link of the plurality of inter router links.

6. A system comprising:

a network planning machine to generate a model of an Internet Protocol network, the network to include a proposed tunnel, the proposed tunnel extending between a head-end tunneling capable router and a tail-end tunneling capable router, the network further comprising a plurality of intermediate tunneling capable routers, and a plurality of inter router links;

a path determining module to determine costs for candidate paths for implementing the proposed tunnel in the network, the cost of each of the candidate paths comprising a sum of transmission costs assigned to respective ones of the inter router links implementing the respective candidate path, the path determining module to compare the costs of the candidate paths to identify a single least cost path for the proposed tunnel or a plurality of equal cost candidate paths for the proposed tunnel, if a single least cost path is identified, the path determining module to select the single least cost path to implement the tunnel;

a count establishment module to, if the plurality of equal cost candidate paths are identified, calculate a proposed usage of each of the equal cost candidate paths, the proposed usage of each of the equal cost candidate paths being calculated by summing respective usage counts for each inter router link of the respective equal cost candidate path, the usage count of each inter router link being calculated based on (1) a number of tunnels already selected to use the inter router link and (2) a number of equal cost candidate paths which would use the inter router link if selected;

a tunnel path selection module to select one of the equal cost candidate paths determined by the path determination module and that has the lowest proposed usage to implement the proposed tunnel; and a tunnel path addition module to add the proposed tunnel as an assigned tunnel to the model of the network, the assigned tunnel to utilize the selected one of the equal cost candidate paths, at least one of the network planning machine, the path determination module, the count establishment module, the tunnel path selection module, and the tunnel path addition module comprising a hardware processor.

7. The system of claim 6, further comprising:

a configuration module to configure a network element of the network based on the assigned tunnel.

8. The system of claim 7, wherein the network element includes at least one of a first tunneling capable router, a second tunneling capable router, a particular intermediate tunneling capable router of the plurality of intermediate tunneling capable routers, or an inter router link.

9. The system of claim 6, wherein, if two or more of the equal cost candidate paths have the lowest proposed usage, the tunnel path selection module is to calculate a number of hops for each of the two or more of the equal cost candidate paths between the head-end tunneling capable network device and the tail-end tunneling capable network device; and select one of the two or more of the equal cost candidate paths having a lowest number of hops to implement the proposed tunnel.

10. They system of claim 9, wherein if more than one of the equal cost candidate paths has the lowest number of hops, the tunnel path selection module is to randomly select one of the equal cost candidate paths having the lowest number of hops to implement the proposed tunnel.

11. The system of claim 6, wherein the plurality of equal cost candidate paths include a plurality of Open Shortest Path First (OSPF) equal cost paths.

12. The system of claim 6, wherein the IP network comprises a Multi Protocol Label Switching (MPLS) enabled IP network.

13. A tangible machine-readable medium excluding propagating signals and comprising instructions, which when executed by one or more processors, cause the one or more processors to at least:

generate, with a processor, a model of an Internet Protocol network, the network to include a proposed tunnel, the proposed tunnel to extend between a head-end tunneling capable router and a tail-end tunneling capable router, the network further comprising a plurality of intermediate tunneling capable routers, and a plurality of inter router links;

determine costs for candidate paths for implementing the proposed tunnel in the network, the cost of each of the candidate paths comprising a sum of transmission costs assigned to respective ones of the inter router links implementing the respective candidate path;

compare the costs of the candidate paths to identify a single least cost path for the proposed tunnel or a plurality of equal cost candidate paths for the proposed tunnel;

if a single least cost path is identified, select the single least cost path to implement the tunnel;

if the plurality of equal cost candidate paths are identified, calculate a proposed usage of each of the equal cost candidate paths, the proposed usage of each of the equal cost candidate paths being calculated by summing respective usage counts for each inter router link of the respective equal cost candidate path, the usage count of each inter router link being calculated based on (1) a number of assigned tunnels already selected to use the inter router link and (2) a number of equal cost candidate paths which would use the inter router link if selected;

select one of the equal cost candidate paths that has the lowest proposed usage to implement the proposed tunnel; and add the proposed tunnel as an assigned tunnel to the model of the network, the assigned tunnel to utilize the selected one of the equal cost candidate paths.

14. The tangible machine-readable medium of claim 13, further comprising instructions, which when executed by one or more processors, cause the one or more processors to at least:

if two or more of the equal cost candidate paths have the lowest proposed usage, calculate a number of hops for each of the two or more of the equal cost candidate paths between the head-end tunneling capable network device and the tail-end tunneling capable network device; and select one of the two or more of the equal cost candidate paths having a lowest number of hops to implement the proposed tunnel.

15. The tangible machine-readable medium of claim 14, further comprising instructions, which when executed by one or more processors, cause the one or more processors to at least if more than one of the equal cost candidate paths has the lowest number of hops, randomly select one of the equal cost candidate paths having the lowest number of hops to implement the proposed tunnel.

* * * * *